Sept. 2, 1930.　　　　C. M. BANKS　　　　1,774,693
JACK
Filed May 2, 1928　　　　2 Sheets-Sheet 2
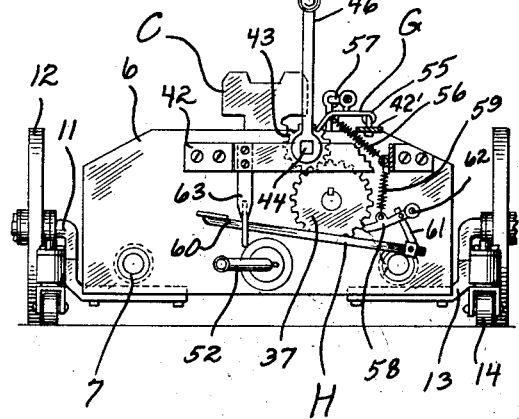
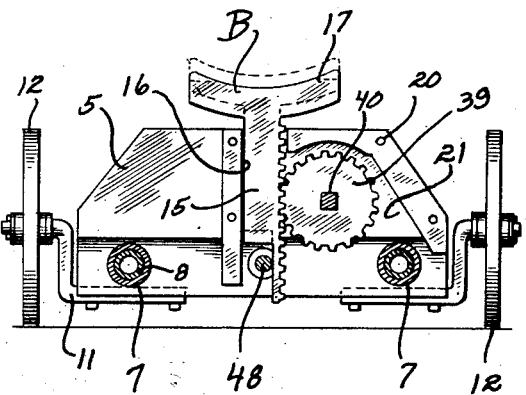
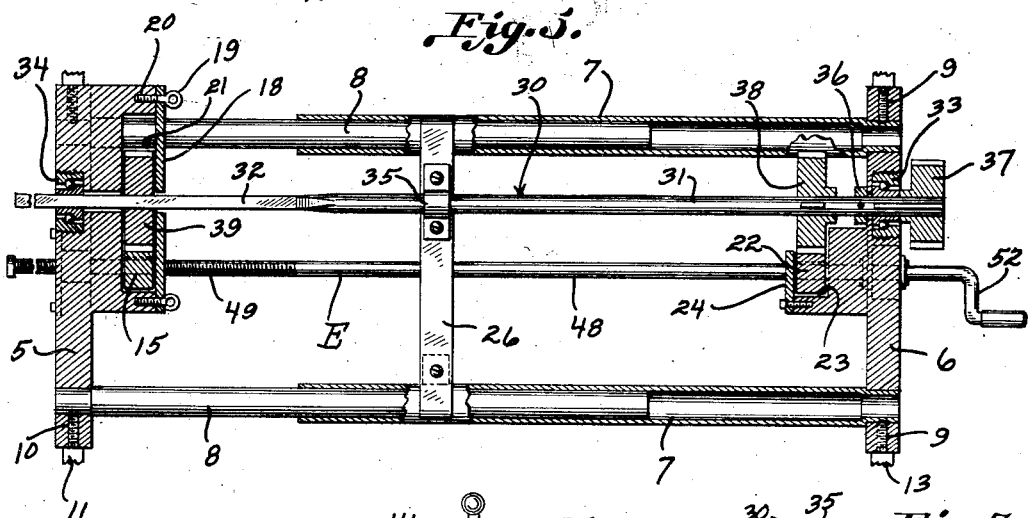
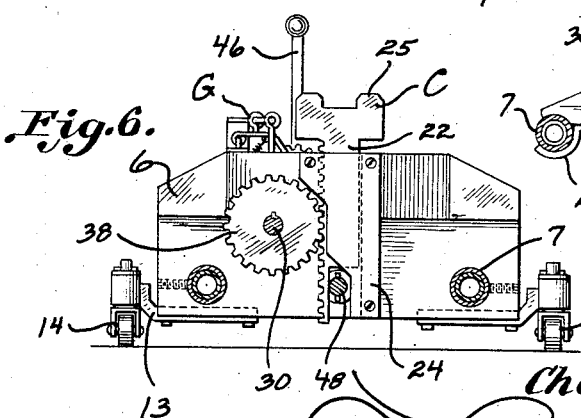
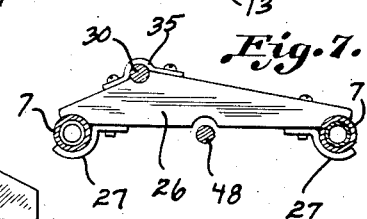
Inventor
Charles M. Banks
Attorneys Patented Sept. 2, 1930

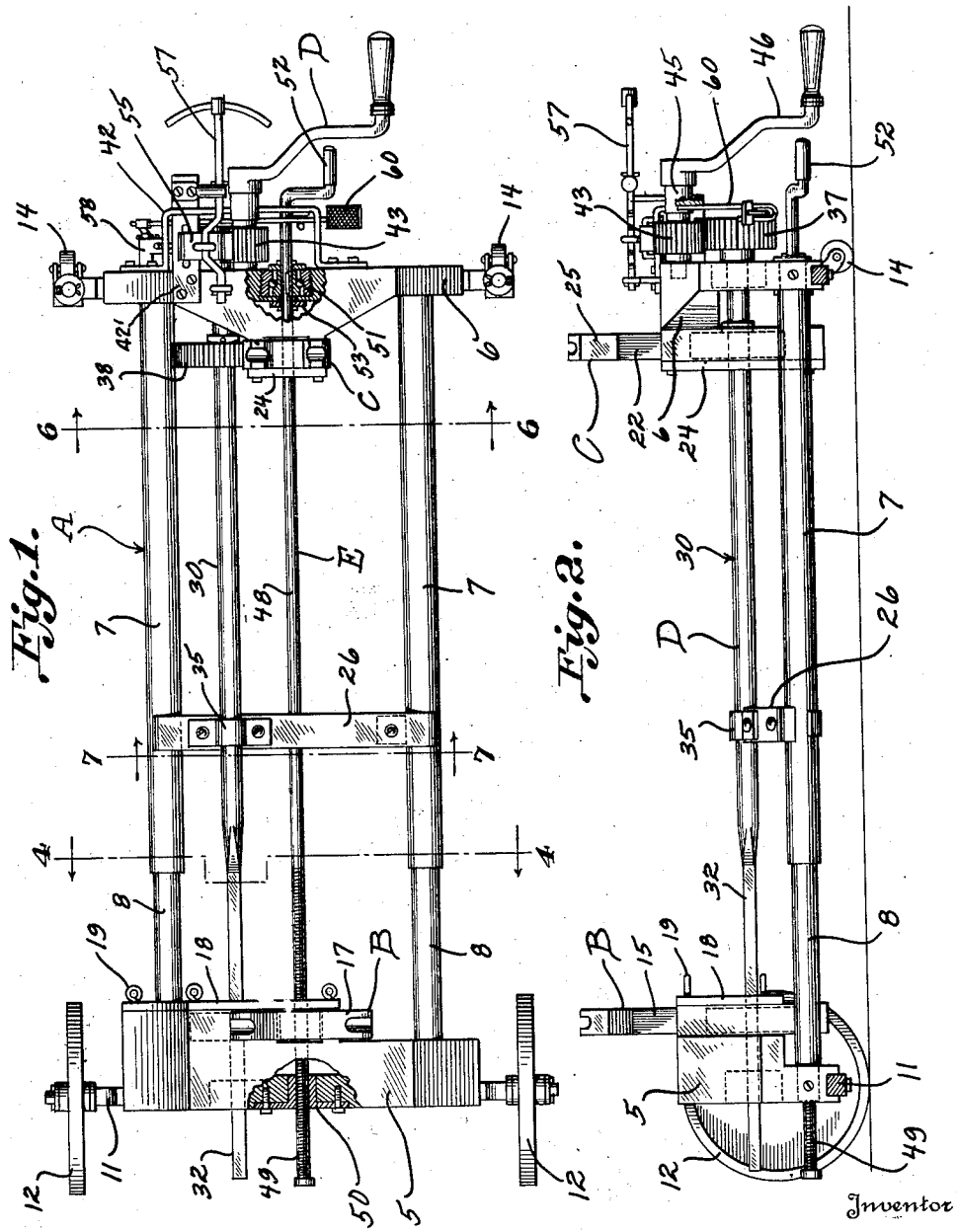

1,774,693

UNITED STATES PATENT OFFICE

CHARLES M. BANKS, OF PHILADELPHIA, PENNSYLVANIA

JACK

Application filed May 2, 1928. Serial No. 274,658.

The present invention relates to improvements in jacks, and relates more particularly to devices of this kind for use in elevating motor vehicles and the like.

With the present types of motor vehicles and wherein a brake is provided for each of the four wheels, it is essential that all four wheels be raised clear of the ground at one time in order to properly adjust the brakes so that the braking action on each wheel will be equal. It is therefore a primary object of the present invention to provide an improved construction for a jack whereby the front and rear wheels of a motor vehicle may be elevated at one time for allowing ready and proper adjustment of the brake associated with each wheel.

A further object of the invention is to provide a device of this character embodying a pair of connected simultaneously actuated jacks capable of ready adjustment toward and away from one another for properly engaging beneath the front and rear axles of motor vehicles having different wheel bases.

A further object of the invention is to provide an improved jack of this character embodying an arrangement whereby one of the jacks may be adjusted vertically with respect to the companion jack so as to have the jacks engage the front and rear axles at substantially the same time when the jacks are being operated.

A further object of the invention is to provide an improved type of wheeled jack which may be readily and easily adjusted for use in elevating motor vehicles of various constructions.

A still further object of the invention is to provide a device of this character which will be strong and durable, and one which may be easily operated from a position at one end of the device.

Other objects and advantages of the invention will be apparent during the course of the following detailed description, taken in connection with the accompanying drawings forming a part of this specification and in which drawings:

Figure 1 is a top plan view of the device and showing fragmentary portions broken away for illustrating the manner in which the extension means operates for varying the spacing between the jacks.

Figure 2 is a side elevation of the device and showing the wheels at one side of the truck removed.

Figure 3 is an end elevation of the rear end of the device.

Figure 4 is a transverse section on line 4—4 of Figure 1.

Figure 5 is a horizontal section illustrating details of construction.

Figure 6 is a transverse section on line 6—6 of Figure 1.

Figure 7 is a transverse section on line 7—7 of Figure 1.

Referring to the drawings in detail, and wherein similar reference characters designate corresponding parts thruout the several views, the letter A designates a truck provided with front and rear lifts or hoists B and C respectively to be simultaneously raised by the operating means D, E adjusting means for varying the spacing between the lifts B and C, and G and H keeper means for the lift operating means D.

The truck A embodies front and rear cross members 5 and 6 respectively connected at their ends by extensible side members each embodying a tubular section 7 and a cylindrical rod section 8 for telescopically fitting in the tubular section 7. The tubular sections 7 are anchored at one end in the rear cross member 6 as by suitable set screws 9, while the rods 8 are anchored at one end in the front cross member 5 as by suitable set screws 10. The rod sections 8 have a free sliding fit in the tubular sections 7 and thus it will be seen that the side members will permit of movement of the end members 5 and 6 toward and away from one another. Mounted as upon suitable axles 11 connected with the lower side of the front cross member 5, are ground engaging wheels 12, while mounted upon suitable brackets 13 connected to the lower side of the rear cross member 6, are suitable caster wheels 14.

Referring now to the lifts or hoists B and C, the same are mounted at the longitudinal center of the truck frame upon the cross members 5 and 6 respectively and are intended to be raised simultaneously by the operating means D. The lift B embodies a rack bar 15 which is mounted vertically in a suitable guide way 16 at the inner side of the cross member 5 and a longitudinally concaved head 17 having its major axis extending transversely of the truck frame. A removable cover plate 18 is arranged over the inner side of the rack bar 15, and this plate 18 may be secured in position by suitable fastening elements 19 having threaded engagement in threaded bores 20 as shown in Figures 4 and 5. The guide way 16 at the toothed side of the rack bar 15 is enlarged to form a pocket 21 to be closed at its inner side by the removable cover plate 18. The lift C for mounting at the inner side of the rear cross member 6 embodies a rack bar 22 which is mounted for vertical sliding movement in a suitable guide way 23 being closed at its inner side by the cover plate 24. The upper end of the rack bar 22 carries a head 25, and this head is preferably of considerably less length than the elongated head 17 of the lift B. The rack bars 15 and 22 are arranged so that the toothed edges thereof face toward a like side of the truck frame, and in the example shown to that side of the longitudinal center of the frame to which the pocket 21 is disposed. The rack bars 15 and 22 are of course polygonal shape in cross section for preventing the bars from rotating in their respective guide ways. It may here be well to mention that the lift B is intended for positioning beneath the front axle of the vehicle while the lift C is intended to be placed beneath the rear axle of the vehicle.

Connecting the intermediate portions of the extensible side members comprising the sections 7 and 8, is a transverse brace member 26 having clips 27 at each end thereof for clamping engagement with the tubular members 7.

The operating means D for raising and lowering of the lifts B and C embodies a power or jack shaft 30 which extends longitudinally of the truck frame with the ends thereof projecting thru and past the end cross members 5 and 6. This jack shaft 30 is formed with a rear cylindrical portion 31 and at its forward end is provided with a square portion 32 which extends thru the pocket 21 formed at one side of the guide way 16. The cylindrical portion 31 of the shaft is mounted in a suitable roller bearing 33 mounted in the rear cross member 6, while the squared portion 32 of the shaft is mounted in and slidable thru a roller bearing 34 mounted in the front cross member 5. The intermediate portion of the jack shaft 30 has a bearing in the brace member 26 as at 35 whereby the shaft will be suitably braced. A collar 36 is mounted on the shaft at the inner side of the cross member 6, and mounted upon the projecting end of the shaft at the outer side of the cross member is a drive gear 37 which may be keyed to the shaft in any preferred manner. By observing Figure 5 it will be seen that the collar 36 and gear 37 act to prevent longitudinal movement of the jack shaft thru the cross member 6. Keyed to the cylindrical portion 31 of the jack shaft is a rear lifting gear 38 the teeth of which are intended to mesh with the teeth of the rack bar 22 of the front lift C. Mounted on the squared portion 32 of the jack shaft is a front lifting gear 39 having a square bore 40 for slidably receiving the squared shaft portion so that the gear is free to be slid longitudinally along the squared portion. This lifting gear 39 is arranged in the pocket 21 with the teeth of the gear meshing with the teeth of the rack bar 15. When the gear 39 is arranged in the pocket 21 and the cover plate 18 arranged over the pocket it will be seen that the gear will be held in meshing relation with the rack bar 15. Secured to the outer side of the rear cross member 6 is a suitable bracket 42 for rotatable mounting of a drive pinion 43 which meshes with the drive gear 37. The shaft 44 on which the pinion 43 is mounted extends thru a bearing sleeve 45 for receiving an operating crank 46 for imparting rotation to the jack shaft 30 thru the gear and pinion 37 and 43 respectively. Thus it will be seen that upon rotation of the pinion 43 by means of the crank 46 that the shaft 30 will be rotated and revolve the lifting gears 38 and 39 for raising or lowering of the lifts B and C respectively.

The means E for adjustment of the front and rear cross members 5 and 6 toward and away from one another for varying the spacing between the lifts B and C embodies a longitudinally arranged adjusting rod 48 having a threaded forward end portion 49 for threaded engagement thru a threaded socket member 50 carried by the front cross member 5. The rear end of the rod 48 is mounted in a suitable roller bearing 51 mounted in the rear cross member 6, and the projecting end of the rod is bent to form a crank handle 52 for rotating the adjusting rod. Suitable thrust plates as at 53 in Figure 1 may be keyed to the shaft 48 at each side of the cross member 6 for preventing longitudinal movement of the adjusting rod thru the cross member. Upon rotation of the rod 48 by the crank handle 50, the front cross member 5 will be moved toward or away from the cross member 6 by feeding of the threaded rod portion 49 thru the threaded socket member 50. The telescoping side members will permit of relative movement of the cross members 5 and 6 by the adjusting rod 48, and by reason of the lifting gear 39 being slidably mounted on the squared shaft portion 32, will allow for the gear to be slid longitudinally on the jack shaft as the cross members 5 and 6 are being adjusted toward or away from one another.

Referring now to the keeper means G for retaining the lifts B and C in their elevated positions, the same embodies a pivoted latch 55 which may be pivotally mounted at one end upon the bracket 42' with the opposite end of the latch so engaging the teeth of the pinion 43 as to allow for free rotation of the pinion in one direction for elevating of the lifts B and C but preventing counter-rotation of the pinion after releasing pressure on the operating crank 46. A spring 56 is provided for normally urging the latch into holding engagement with the drive pinion, and a releasing rod 57 pivotally mounted above the latch is provided with an offset crank portion for connection with the latch whereby the latch may be swung free of the drive pinion when lowering the lift. As will be observed, the release rod 57 is so connected with the latch 55 as to prevent the releasing rod being turned to a position for holding the latch out of engagement with the pinion, and this arrangement has been provided so that the keeper means G will cooperate with the keeper means H in a manner for lowering the lifts tooth by tooth or with a step movement.

The keeper means H comprises a pivoted pawl 58 mounted at the outer face of the rear cross member 6 for engagement with the teeth of the drive gear 37. A spring 59 is provided for normally urging the pawl into engagement with the teeth of the drive gear, and a release lever 60 is connected at one end by means of an arm 61 to the pawl for drawing the pawl out of engagement with the teeth of the drive gear. The pawl 58 is pivotally connected as at 62 to the cross member 6. By observing Figure 3 it will be seen that when the free end of the lever 60 is depressed, the free end of the pawl 58 will be swung downwardly out of engagement with the gear teeth. A stop 63 may depend from the bracket 42 for limiting downward movement of the releasing lever 60. The latch 55 and pawl 58 are intended to alternately engage between the teeth of the pinion and gear 43 and 37 respectively so that the lifts B and C may be lowered with a step by step movement by alternately actuating the keeper means G and H.

Since the front axles on the majority of motor vehicles are higher or have a greater ground clearance than the rear axles, or in practically all cases are higher than the bottom of the differential housing, the construction of the jack is such as to permit of the lift B being adjusted vertically with respect to the lift C so that the head portions of the lifts will engage the front and rear axles of the vehicle at substantially the same time while being elevated. This arrangement has been made possible by provision of the removable cover plate 18. When desiring to raise or lower the lift B it is merely necessary to remove the threaded fastening elements 19 so that the plate 18 may be removed from over the pocket 21 which will permit of the lifting gear 39 being slid rearwardly along the squared shaft portion 32 out of meshing engagement with the rack bar 15. The lift B may then be raised or lowered and the gear 39 again slid into the pocket 21 into meshing relation with the teeth of the rack bar 15. The cover plate 18 may then be replaced and secured by the means 19 for retaining the gear 39 in meshing relation with the rack bar.

The object in so having the head 17 of the lift B relatively long and longitudinally concaved is to prevent tilting of the vehicle to either side while being raised, and also permits of the head being readily passed beneath low crank cases and drop center front axles.

From the foregoing description it will be apparent that a novel and improved construction for lifting jacks has been provided which will be found especially well adapted for use in connection with motor vehicles for raising all four wheels of the vehicle from the ground to allow for ready and proper adjustment of the brakes. It will also be apparent that the adjustable features of the jack will permit of the jack being adjusted to accommodate practically all types of motor vehicles regardless of the wheel base dimensions and the particular type of axles.

Changes in detail may be made to the form of invention herein shown and described, without departing from the spirit of the invention or the scope of the following claims.

I claim:

1. In a jack the combination of a truck frame embodying front and rear cross members, a lift for each cross member embodying a rack bar vertically movable in the cross members, a shaft journaled at its ends in the cross members, a gear carried by the shaft for each lift and meshing with the teeth of the rack bars, a drive gear keyed to one end of the shaft at the outer side of one of the cross members, a pinion meshing with the drive gear, means for rotating the pinion, and independently operable keeper means engageable one with the drive gear and the other with the pinion and alternately engageable with the teeth thereof to allow lowering of the lifts with an intermittent movement.

2. In a jack the combination of a truck frame embodying front and rear cross members, a lift for each cross member and each embodying a vertically arranged rack bar, a shaft journaled in the cross members against longitudinal movement, a gear keyed to the shaft and meshing with the teeth of one of said rack bars, a second gear slidable and non-rotatably mounted on the shaft for meshing with the teeth of the companion rack bar, and means for imparting rotation to the shaft for simultaneously imparting vertical movement to the lifts.

3. In a jack the combination of a truck frame embodying front and rear cross members, a lift for each cross member and each including a rack bar mounted for vertical sliding movement in the cross members, a shaft journaled in the cross members and held against longitudinal movement, a gear fixedly secured to the shaft for meshing with the teeth of the rack bar of one lift, a second gear slidable and non-rotatably mounted on the shaft for sliding movement into and out of meshing relation with the teeth of the companion rack bar, detachable means for retaining said last mentioned gear in operative relation to its rack bar, and means for imparting rotation to said shaft.

4. In a jack the combination of a truck frame embodying front and rear cross members each being provided with a vertical guide way, said guide way in the front cross member opening at one side into a pocket, a lift for each cross member including rack bars vertically movable in the guide ways, a shaft journaled at its ends in the cross members and having its front end extending thru said pocket, a gear fixedly mounted on the shaft adjacent the rear end thereof for meshing with the rack bar mounted in the rear cross member, a second gear slidably and non-rotatably mounted on the shaft and movable therealong into and out of said pocket for meshing with the rack bar mounted in the front cross member, a removable cover plate arranged over the pocket for retaining the gear in meshing relation with its rack bar, and means for imparting rotation to the shaft.

5. In a device of the class described the combination of a truck frame embodying front and rear cross members and extensible side members connecting the cross members, a lift mounted for vertical sliding movement in each cross member, operating means for simultaneously imparting vertical movement to each of said lifts, and means for moving the cross members toward and away from one another for varying the spacing between said lifts.

6. In a device of the class described the combination of a truck frame embodying front and rear cross members and extensible side members connecting the cross members, a lift mounted for vertical sliding movement in each cross member, operating means for simultaneously imparting vertical movement to both of said lifts, and adjusting means for varying the spacing between the cross members including a rotatable adjusting rod mounted against longitudinal movement in one of the cross members and having its opposite end in threaded engagement with the companion cross member.

7. In a device of the class described the combination of a truck frame embodying front and rear cross members and extensible side members connecting the cross members, a lift mounted for vertical sliding movement in each cross member and each embodying a rack bar, a shaft journaled against longitudinal movement in the rear cross member and having a square shaped forward portion journaled for sliding movement thru the front cross member, a gear keyed to the shaft for meshing with the rack bar mounted in the rear cross member, a second gear slidably and non-rotatably mounted on the squared portion of the shaft for meshing with the rack bar mounted in the front cross member, means for rotating said shaft, a socket member carried by the front cross member and having a threaded bore, and a rotatable adjusting rod journaled against longitudinal movement in the rear cross member and having a threaded forward portion for threading thru the bore of said socket member.

CHARLES M. BANKS.